Nov. 2, 1926. 1,605,357
H. F. LESSMANN
LOADING ATTACHMENT FOR TRACTORS
Filed Oct. 8, 1923 4 Sheets-Sheet 1
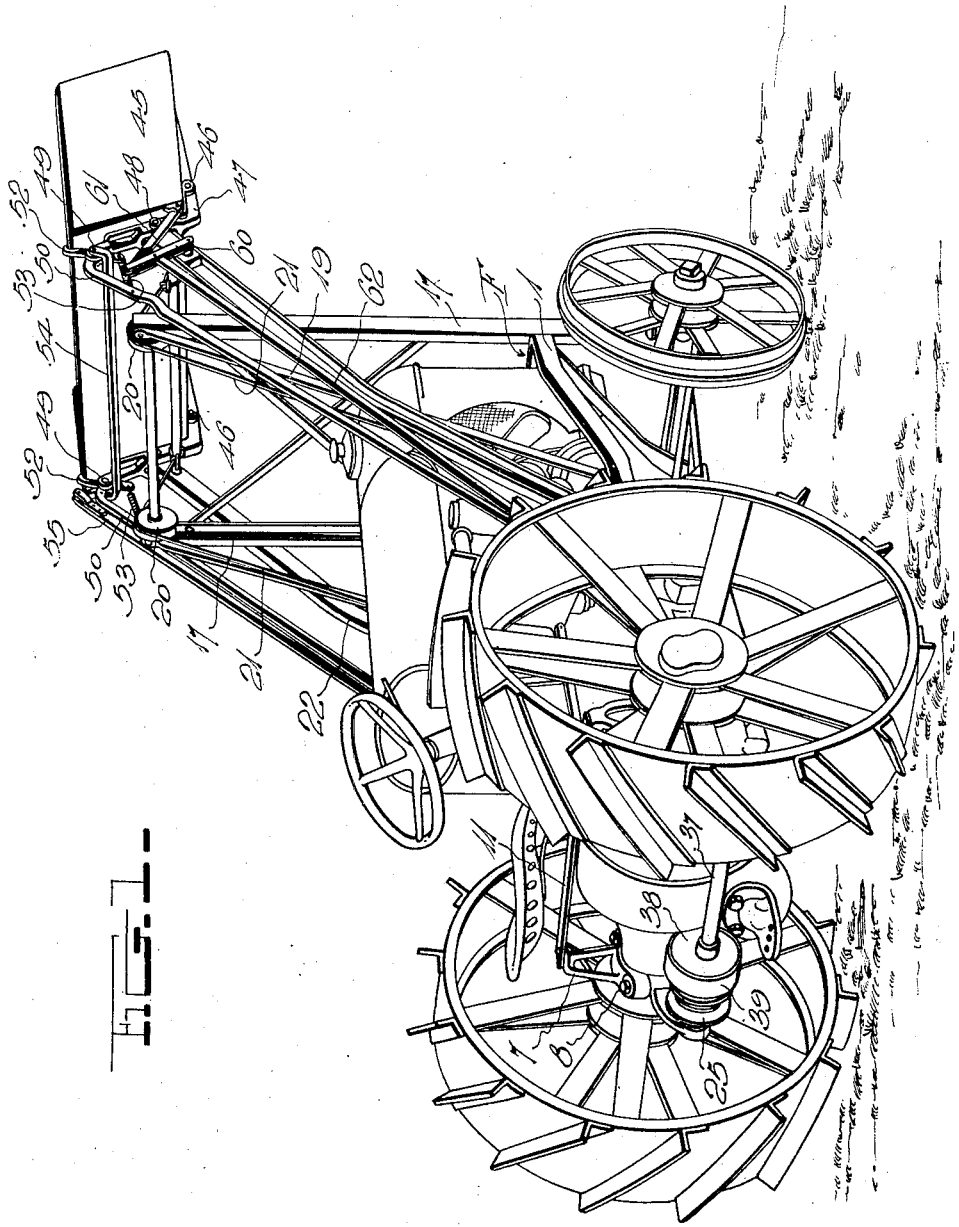
Witness
H. Woodard
Inventor
H. F. LESSMANN
By H. B. Willson &co
Attorneys

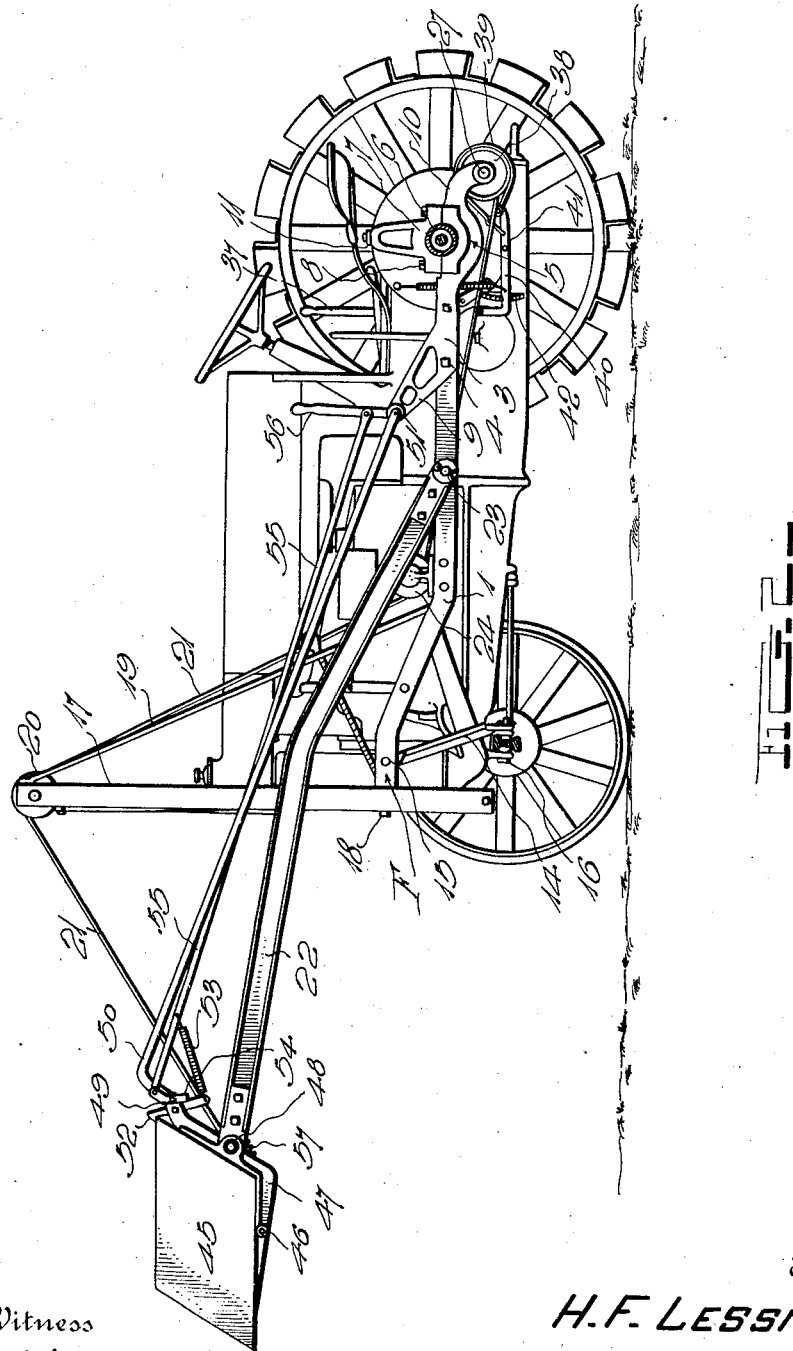

Nov. 2, 1926.
H. F. LESSMANN
1,605,357
LOADING ATTACHMENT FOR TRACTORS
Filed Oct. 8, 1923
4 Sheets-Sheet 3
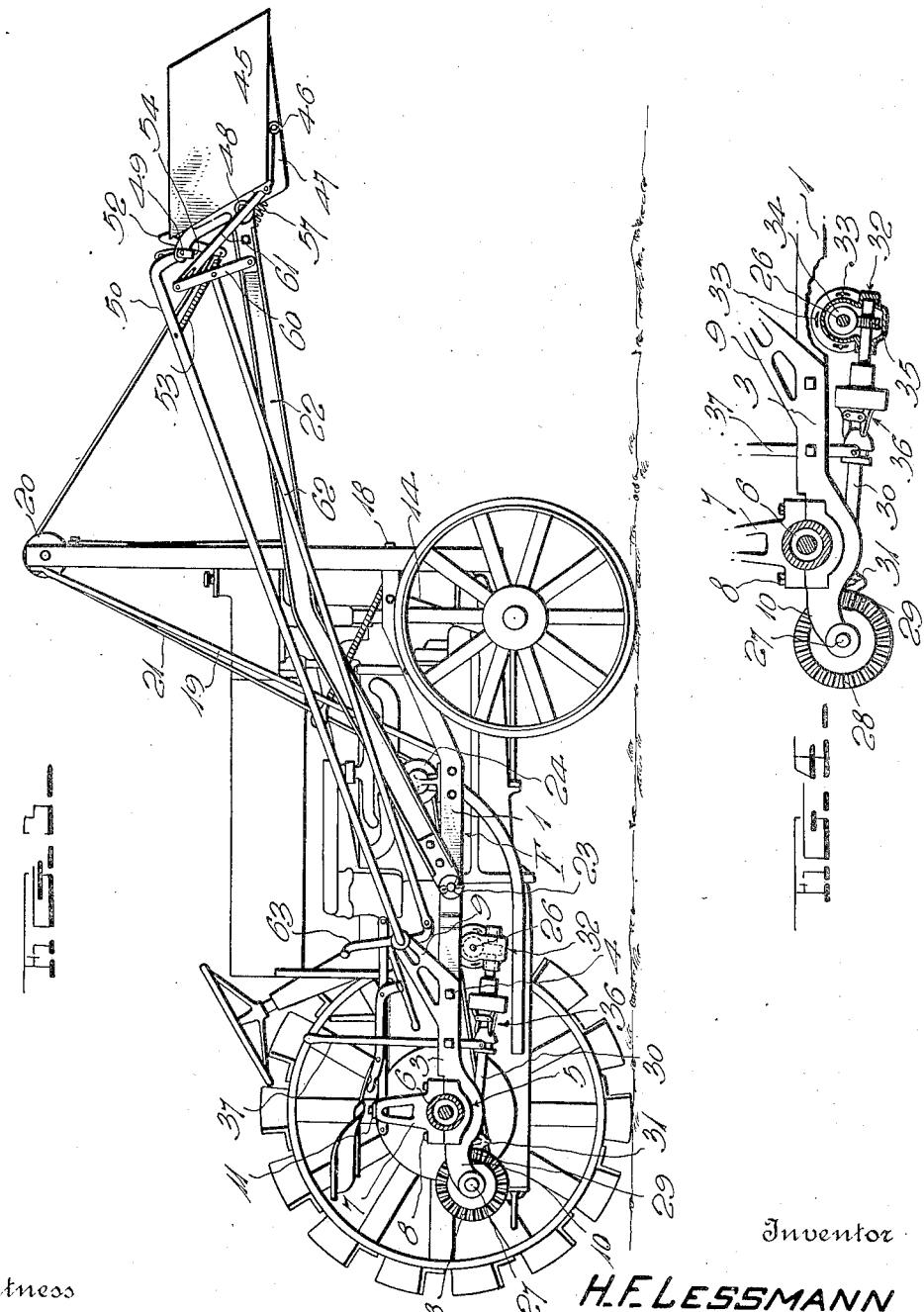
Witness
H. Woodard
Inventor
H.F. LESSMANN
By H.O.R.Willson&Co
Attorneys

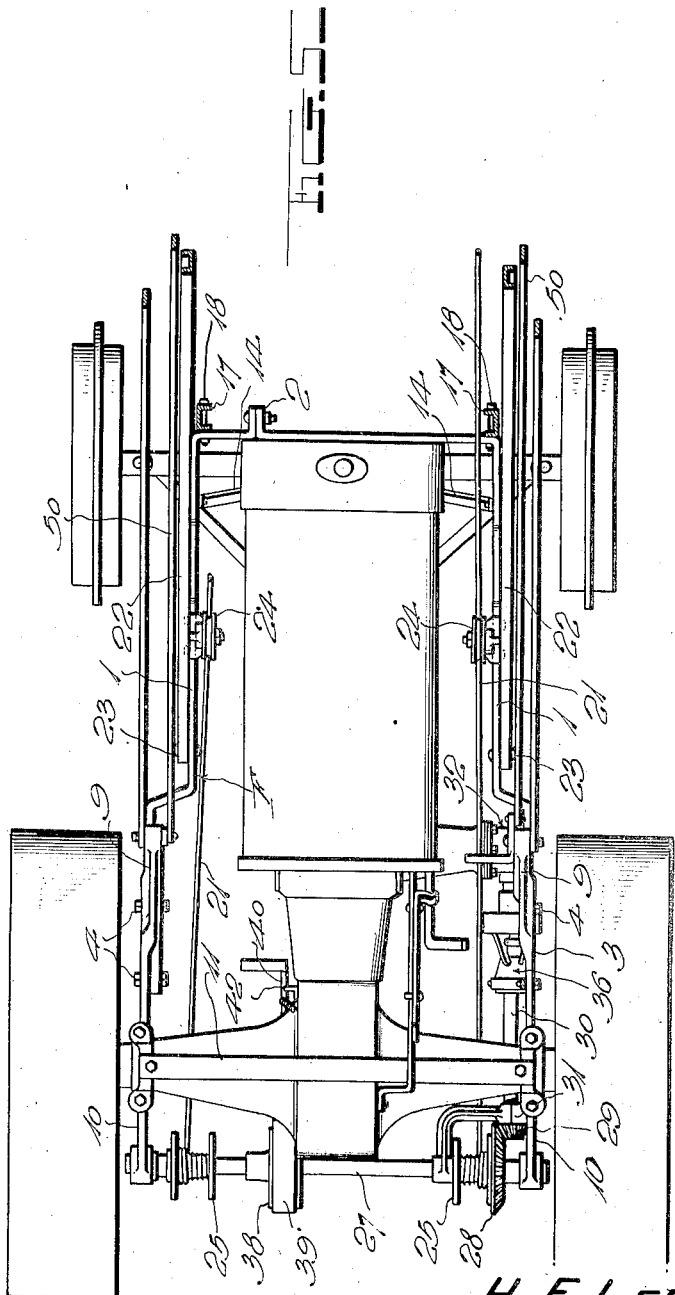

Patented Nov. 2, 1926.

1,605,357

UNITED STATES PATENT OFFICE.

HERBERT F. LESSMANN, OF DES MOINES, IOWA.

LOADING ATTACHMENT FOR TRACTORS.

Application filed October 8, 1923. Serial No. 667,256.

My invention relates to improvements in hoisting and loading devices and more particularly to a simple and inexpensive attachment for tractors, whereby the latter may carry a loading scoop or the like and operate the same by power.

Another object is to provide an attachment of the character set forth which is quickly applicable to and removable from the well known Fordson tractor without the necessity of making any alterations whatever in the tractor construction, novel provision being made whereby the operating mechanism for the loading scoop, fork or the like, is driven from the usual power take-off shaft of the tractor.

A still further object is to provide a loading attachment of the class described which may be easily operated by the person driving the tractor, all controls being located within easy reach of the driver's seat.

Yet another object is to make novel provision for holding the loading scoop or the like against tilting until the load is raised to the required point and for then permitting it to dump.

A still further aim is to provide unique means for moutning the scoop upon its carrying arms, in such a manner that undesirable tilting of the scoop during raising and lowering of said arms does not take place.

With the foregoing and minor objects in view, the invention resides in the novel construction and combination of parts hereinafter described and claimed, the descriptive matter being supplemented by the accompanying drawings.

Figure 1 is a perspective view of my invention attached to a Fordson tractor.

Figure 2 is a side elevation with parts removed and in section.

Figure 3 is a view similar to Fig. 2 but looking in the opposite direction.
Figure 4 is a detail elevation partly in section, showing more particularly the means for operating the hoisting attachment from the usual power take-off shaft of the tractor.

Figure 5 is a top plan view partly in horizontal section.

In the drawings, I have illustrated the preferred form of my machine, which form has been successfully constructed and operated, but it will be understood that the several improvements are not restricted to the exact details disclosed. Furthermore, although I have shown the machine equipped with a scoop, it will be understood that a platform, fork or other equivalent device could be substituted for said scoop to permit use of the loading attachment for any desired purpose. Hence, the word "scoop" appearing hereinafter is to be construed accordingly.

The loading attachment includes a main base frame F which is adapted to be detachably secured to a tractor, for the purpose of carrying all parts of the hoisting mechanism and its operating means. In the present showing, this frame is designed for use upon a Fordson tractor, but it might be shaped for application to other machines. In the construction illustrated, the frame F includes a pair of side bars 1 for disposition at opposite sides of the tractor body, the front ends of said bars being offset upwardly, bent laterally toward each other, and bolted together as shown at 2. These side bars may be formed of one piece, but I have shown each of them constructed of a relatively long front section and a rear section 3, the two being secured together by bolts or the like 4. Between their ends, I have shown the bar sections 3 depressed to provide seats 5 to receive the rear axle 6 of the tractor. Arched clamping members 7 are adapted to pass over the axle as shown most clearly in Figs. 2, 3, and 5 and said members are detachably secured to the bar sections 3 by bolts 8. The clamping members 7 in the present embodiment of the invention, are connected by a transverse 11 which is adapted to extend across the differential housing of the tractor. For a purpose yet to appear, the front ends of the bar sections 3 are directed upwardly to form standards 9, while at their rear ends, said bar sections are turned downwardly as indicated at 10.

For supporting the front end of the frame, I have shown a V-shaped supporting or radius bar 14 secured at its ends to the side bars 1 by bolts or the like 15, said bar being adapted, in the present showing, to pass under the front end of the tractor motor and to be connected to the machine by means of a king-bolt 16 which is a trifle longer than and is substituted for the usual king-bolt by means of which the front axle is pivoted to the base of the motor.

At some suitable point, preferably at its extreme front end, the frame F carries a standard 17 which is here shown bolted to the side bars 1 as indicated at 18, said standard being suitably braced by rods 19 and being provided with one or more cable guides 20, two being preferably employed. Over these guides, I pass a pair of hoisting cables 21 whose front ends are attached to the front ends of a pair of upwardly swinging scoop-carrying arms 22, the rear ends of these arms being pivoted at 23 to the side bars 1. Adjacent the pivots 23 or at other suitable points, the frame F carries cable guides 24 beneath which the cables 21 pass, the rear ends of said cables being wound on a pair of drums 25 which may be driven at will from the usual power take-off shaft 26 of the tractor. The arrangement described below is preferably employed for this purpose.

The drums 25 rotate with a transverse shaft 27 which is mounted on the downturned ends 10 of the bar sections 3. This shaft is provided with a bevel gear 28 meshing with a bevel pinion 29 on a longitudinal shaft 30 whose rear end is supported by the frame, through the instrumentality of a suitable bearing 31. The front end of the shaft 30 passes into a suitable gear housing 32 which is adapted to be bolted at 33 to the tractor, so that a worm 34 mounted on the shaft 26, may be positioned within said casing as shown most clearly in Fig. 4. This worm meshes with a worm gear 35 on the front end of the shaft 30 and attention may here be directed to the fact that between its front and rear ends, this shaft is divided and is provided with an appropriate clutch 36 having a controlling lever 37. When the shaft 26 is being driven and the clutch 36 is in, the shaft 30 will, through the instrumentality of the gears 28 and 29 drive the shaft 27 and will consequently rotate the drums 25 to wind the hoisting cables and swing the arms 22 upwardly. By releasing the clutch, however, the arms will descend by gravity and I prefer to employ a brake on the shaft 27 so that the speed at which the cables are payed out may be controlled. The form of brake described below is preferred.

A suitable drum 38 is secured upon the shaft 27 and co-operates with a band brake 39, this brake being provided with a forwardly extending operating lever 40 as shown most clearly in Fig. 2. At 41, this lever is adapted to be fulcrumed upon the differential housing of the tractor, by means of one of the usual bolts with which the latter is provided. Attached to the differential housing, through the instrumentality of another of the well known bolts, is a rack 42 for temporarily holding the lever 40 in any position to which it may be depressed by foot.

The numeral 45 designates a scoop carried by the front ends of the arms 22 and in the present showing, this scoop is pivoted at 46 upon a pair of L-shaped scoop rests 47, the latter being in turn pivoted at 48 to the arms 22. At their upper ends, the scoop rests 47 are pivoted, as indicated at 49 to the front ends of a pair of longitudinal links 50, the rear ends of these links being pivoted at 51 to the upper ends of the standards 9. It thus follows that when the arms 22 are raised and lowered, the links 50 serve to always retain the scoop rests 47 in such positions as to prevent undesirable tilting of the scoop 45.

To normally hold the scoop against dumping, but to permit it to tilt forwardly and dump when desired, I provide a pair of latches 52 which are preferably pivoted to the upper ends of the scoop rests 47 to engage the upper edge of the scoop back. Appropriate springs 53 are preferably used to apply the latches 52. For releasing these latches, I have provided the latch-releasing bar 54 which is shown most clearly in Fig. 1, the ends of this bar being bent upwardly and pivoted to the scoop rests 47 upon the same pivots 49 which connect the longitudinal links 50 with said rests. One end of the bar 54 extends upwardly beyond the pivots 49 and this end is connected by a link 55 with a hand lever 56 fulcrumed upon one of the standards 9 within easy reach of the driver of the tractor. Pulling upon this lever 56, causes the link 55 to rock the latch-releasing bar 54, thereby disengaging both latches 52 from the scoop 45 and permitting the latter to dump upon its pivots 46. When this dumping takes place, the shock may well be absorbed by any suitable cushioning spring such as that indicated at 57 in Figs. 2 and 3.

For again righting the scoop after it has been dumped, I make novel provision, shown particularly in Figs. 1 and 3. In these figures, the numeral 60 designates an upstanding lever fulcrumed to the front end of one of the arms 22, said lever being connected by a link 61 with the scoop 45, in such a manner that when the scoop is dumped and a quick pull is exerted upon the lever 60, said scoop will be returned to its initial position and secured by the latches 52. For operating the lever 60, I employ a longitudinal link 62 leading rearwardly therefrom to a suitable foot lever 63 which is fulcrumed on the standard 9 opposite the hand lever 56.

By constructing the invention in or approximately in the manner shown and described, it may be easily and inexpensively manufactured and marketed and will serve very expeditiously to convert a tractor into a power driven motor or other hoisting machine. Without making any changes whatever in the tractor construction, the attachment may be connected therewith and may be operated entirely from power derived from the tractor engine. In operation, the machine is propelled forwardly with the scoop 45 lowered, whereby to load the latter. This having been done, the clutch controlling lever 37 is operated to throw the clutch 36 into play, thereby driving the drums 25 and causing the cables to swing the arms 22 upwardly. This having been done, the machine may be again propelled to position the loaded scoop over a wagon, manure spreader or other receiver, whereupon operation of the lever 56 will release the latches 52 and permit the scoop to dump into said receiver. By means of the scoop resetting means 61, 62 and 63, the scoop may now be righted and held by the latches 52 so that when the arms 22 are again lowered, the machine is in readiness for reloading.

Since excellent results have been obtained from the several details herein shown, they are preferably followed when the invention is attached to a Fordson tractor, but it is to be understood that within the scope of the invention as claimed, numerous minor changes may be made.

I claim:—

1. The combination with a tractor having a transverse power take-off shaft; of a base frame mounted detachably on said tractor, a hoisting device mounted on said base frame and having a transverse operating shaft mounted at the rear end of said frame, a longitudinal shaft adjacent one longitudinal side of the frame mounted at one end on said frame and operatively associated with said operating shaft, means for supporting the other end of said longitudinal shaft from the tractor independently of said frame, and means for driving said longitudinal shaft from said power take-off shaft.

2. An attachment for tractors comprising a base frame provided with side bars to receive the body of the tractor therebetween, said bars being adapted to extend across and to project rearwardly from the rear axle of the tractor, means for securing said bars detachably to said rear axle, means for supporting the front end of the frame, and hoisting means mounted on said frame and including a transverse shaft supported by the rear ends of said side bars for disposition behind the axle of the tractor.

3. An attachment for tractors comprising a hoisting device having a base frame, means for detachably clamping said frame to the rear end of the tractor, and a front support for said frame having provision for connection to the kingbolt of the front axle of the tractor.

4. An attachment for tractors comprising a hoisting device having a base frame, means for detachably clamping said frame to the rear end of the tractor, and a V-shaped supporting bar secured at its ends to the front end of said frame, the center of said V-shaped bar having an opening adapted to receive a kingbolt of the front axle of the tractor.

5. An attachment for tractors comprising a base frame provided with side bars to receive the body of a tractor therebetween, said bars being adapted to extend under the rear axle of the tractor and to project rearwardly from said axle, clamp members adapted to extend over the axle, bolts for securing said clamp members and said side bars together, means for supporting the front end of the frame, and hoisting means mounted on said frame and including a transverse shaft supported by the rear ends of said side bars for disposition behind the rear axle of the tractor.

6. An attachment for tractors comprising a hoisting device having a base frame provided with side bars to receive the body of a tractor therebetween, said bars being adapted to extend across the rear axle of the tractor, clamp members to extend across the side of the axle opposite said side bars, bolts for securing said clamp members and side bars together, a cross bar secured to and extending between said clamp members and adapted to extend across the differential housing of the tractor, and means for supporting the front end of the aforesaid base frame.

7. An attachment for tractors comprising a hoisting device having a base frame provided with side bars adapted to extend across the rear axle of the tractor, the rear ends of said side bars being turned downwardly, a drum mounted between said downturned bar ends and instrumental in operating said hoisting device, and means extending forwardly from the drum shaft adjacent one side bar of the frame for connection with the power take-off shaft of the tractor, for operating said drum.

8. A hoisting attachment for tractors comprising a base frame carrying hoisting means including a transverse operating shaft at the rear end of said frame, a longitudinal shaft adjacent one longitudinal side of the frame mounted at one end on said frame and operatively associated with said operating shaft, means whereby the other end of said longitudinal shaft may be supported from the tractor and driven from a power take-off shaft, and means whereby said frame may be detachably mounted upon the tractor.

9. A hoisting attachment for tractors comprising a base frame and means for clamping the same to the rear axle of the tractor, a transverse operating shaft for the hoisting means carried by the frame and adapted for disposition behind the rear axle of the tractor, a brake for said shaft, and a brake operating lever extending forwardly from said brake and adapted to be attached to the tractor differential housing by one of the usual bolts of the latter.

10. A hoisting machine comprising a frame, a vertically swinging arm pivoted thereto, a scoop rest pivoted to the free end of said arm, a link pivoted to said scoop rest at a point spaced from the pivotal axes of the same and pivoted to said frame at a point spaced laterally from the pivot of said arm, a scoop pivoted on said scoop rest, and release means for normally holding the scoop against dumping.

11. A hoisting machine comprising a frame, a vertically swinging hoisting arm pivoted thereon, a pivoted scoop carried by the free end of said arm and releasable means for normally holding it against dumping, an upstanding lever fulcrumed to said arm adjacent said scoop, a link pivotally connecting one end of said lever with said scoop, and means extending from said lever to said frame for operating the former to return the scoop to normal position after dumping.

12. A hoisting machine comprising a frame, a pair of vertically swinging arms mounted on said frame, a tilting scoop on the front end of said arms, scoop holding latches on said arms, a latch releasing bar extending between said arms and having laterally extending ends pivoted to said arms, and means for swinging said bar on its pivots to release said latches.

13. In combination with a tractor, a hoisting attachment comprising a frame adapted to be attached to said tractor, a vertically swinging arm pivoted to said frame and extending beyond the forward end of the tractor, a substantially L-shaped scoop rest carried by said arm, said arm and the base portion of said scoop rest occupying substantially horizontal positions for loading, a scoop having its bottom resting on and projecting forwardly of the base of said scoop rest and its back wall resting against the upright member of said scoop rest when in loading position, whereby forward advance of the tractor will be communicated through said frame, swinging arm and scoop rest to the scoop for loading purposes, and releasable latching means for normally holding said scoop in loading position on said scoop rest.

14. In combination with a tractor, a hoisting attachment comprising a frame adapted to be attached to said tractor, a vertically swinging arm pivoted to said frame and extending beyond the forward end of the tractor, a substantially L-shaped scoop rest pivotally mounted on said arm, said arm and the base portion of said scoop rest occupying substantially horizontal positions for loading, a scoop having its bottom resting on and projecting forwardly of the base of said scoop rest and its back wall resting against the upright member of said scoop rest when in loading position, whereby forward advance of the tractor will be communicated through said frame, swinging arm and scoop rest for loading purposes, means to normally prevent tilting of said scoop rest, and releasable latching means for holding the scoop in loading position on said scoop rest.

15. A hoisting machine comprising a frame, a vertically swinging arm pivoted thereto, a substantially L-shaped scoop rest pivoted to the free end of the said arm, a link pivoted to said scoop rest at a point spaced from the pivotal axis of the same and pivoted to said frame at a point spaced laterally from the pivot of said arm, a scoop pivoted on said scoop rest and adapted when in loading position to have its back and bottom walls in close contact with the arms thereof, and releasable means for normally holding the scoop against dumping.

16. A hoisting machine comprising a frame, a pair of vertically swinging arms mounted on said frame, a tilting scoop on the front end of said arms, scoop holding latches on said arms, a latch releasing bar extending between said arms and having laterally extending ends pivoted to said arms, one of said laterally extending arms being extended beyond its pivot to form a lever, a link pivotally connected to said lever and extending rearwardly of the frame, and a manually operable lever for reciprocating said link to permit dumping of the scoop.

In testimony whereof I have hereunto affixed my signature.

HERBERT F. LESSMANN.